US010311048B2

(12) United States Patent
Wein

(10) Patent No.: US 10,311,048 B2
(45) Date of Patent: Jun. 4, 2019

(54) FULL AND PARTIAL MATERIALIZATION OF DATA FROM AN IN-MEMORY ARRAY TO AN ON-DISK PAGE STRUCTURE

(71) Applicant: SAP SE, Walldorf (DE)

(72) Inventor: David Wein, St. Paul, MN (US)

(73) Assignee: SAP SE, Walldorf (DE)

( * ) Notice: Subject to any disclaimer, the term of this patent is extended or adjusted under 35 U.S.C. 154(b) by 667 days.

(21) Appl. No.: 14/944,068

(22) Filed: Nov. 17, 2015

(65) Prior Publication Data
US 2017/0139981 A1 May 18, 2017

(51) Int. Cl.
G06F 16/23 (2019.01)
G06F 16/2453 (2019.01)
G06F 3/06 (2006.01)
G06F 16/27 (2019.01)
G06F 16/21 (2019.01)
G06F 16/28 (2019.01)
G06F 16/176 (2019.01)
G06F 15/16 (2006.01)

(52) U.S. Cl.
CPC ........ G06F 16/2393 (2019.01); G06F 3/0619 (2013.01); G06F 3/0665 (2013.01); G06F 3/0689 (2013.01); G06F 16/1774 (2019.01); G06F 16/219 (2019.01); G06F 16/2308 (2019.01); G06F 16/2322 (2019.01); G06F 16/2329 (2019.01); G06F 16/2336 (2019.01); G06F 16/2358 (2019.01); G06F 16/24539 (2019.01); G06F 16/27 (2019.01); G06F 16/283 (2019.01)

(58) Field of Classification Search
CPC ......... G06F 17/30383; G06F 17/30457; G06F 17/30368; G06F 16/2393; G06F 16/24539; G06F 16/2358

USPC .......................................................... 707/615
See application file for complete search history.

(56) References Cited

U.S. PATENT DOCUMENTS 5,701,480 A 12/1997 Raz
5,717,919 A 2/1998 Kodavalla et al.
5,758,145 A 5/1998 Bhargava et al.
(Continued)

FOREIGN PATENT DOCUMENTS

EP 2778961 A1 9/2014
WO WO-01/29690 A2 4/2001

OTHER PUBLICATIONS

"HANA database lectures—Outline Part 1 Motivation—Why main memory processing." Mar. 2014 (Mar. 2014). XP055197666. Web. Jun. 23, 2015; URL:http://cse.yeditepe.edu.tr/-odemir/spring2014/cse415/HanaDatabase.pdf.
(Continued)

Primary Examiner — Usmaan Saeed
Assistant Examiner — Brian E. Weinrich
(74) Attorney, Agent, or Firm — Mintz Levin Cohn Ferris Glovsky and Popeo, P.C.

(57) ABSTRACT

Changes to data in a column in an in memory array resulting from operations of a transaction thread can be written to a database object associated with the column. The database object can be marked for materialization upon completion of all of the plurality of operations of the transaction thread such that the column and the changes are materialized from the in-memory array to one or more pages stored on a persistent storage based on the marking.

12 Claims, 11 Drawing Sheets

(56) References Cited

U.S. PATENT DOCUMENTS

| | | | |
|---|---|---|---|
| 5,794,229 A | 8/1998 | French et al. | |
| 5,870,758 A | 2/1999 | Bamford et al. | |
| 6,070,165 A | 5/2000 | Whitmore | |
| 6,275,830 B1 | 8/2001 | Muthukkaruppan et al. | |
| 6,282,605 B1 | 8/2001 | Moore | |
| 6,490,670 B1 | 12/2002 | Collins et al. | |
| 6,754,653 B2 | 6/2004 | Bonner et al. | |
| 6,865,577 B1 | 3/2005 | Sereda | |
| 7,698,712 B2 | 4/2010 | Schreter | |
| 8,024,296 B1 | 9/2011 | Gopinathan et al. | |
| 8,161,024 B2 | 4/2012 | Renkes et al. | |
| 8,364,648 B1 | 1/2013 | Sim-Tang | |
| 8,510,344 B1 | 8/2013 | Briggs et al. | |
| 8,650,583 B2 | 2/2014 | Schreter | |
| 8,732,139 B2 | 5/2014 | Schreter | |
| 8,768,891 B2 | 7/2014 | Schreter | |
| 9,098,522 B2 | 8/2015 | Lee et al. | |
| 9,141,435 B2 | 9/2015 | Wein | |
| 9,262,330 B2 | 2/2016 | Muthukumarasamy | |
| 9,268,810 B2 | 2/2016 | Andrei et al. | |
| 9,275,095 B2 | 3/2016 | Bhattacharjee et al. | |
| 9,275,097 B2 | 3/2016 | DeLaFranier et al. | |
| 9,305,046 B2 | 4/2016 | Bhattacharjee et al. | |
| 9,372,743 B1 | 6/2016 | Sethi et al. | |
| 2001/0051944 A1 | 12/2001 | Lim et al. | |
| 2002/0107837 A1 | 8/2002 | Osborne et al. | |
| 2002/0156798 A1 | 10/2002 | Larue et al. | |
| 2003/0028551 A1 | 2/2003 | Sutherland | |
| 2003/0065652 A1 | 4/2003 | Spacey | |
| 2003/0204534 A1 | 10/2003 | Hopeman et al. | |
| 2004/0034616 A1 | 2/2004 | Witkowski et al. | |
| 2004/0054644 A1 | 3/2004 | Ganesh et al. | |
| 2004/0225666 A1* | 11/2004 | Hinshaw | G06F 17/30383 707/999.1 |
| 2004/0249838 A1 | 12/2004 | Hinshaw et al. | |
| 2005/0097266 A1 | 5/2005 | Factor et al. | |
| 2005/0234868 A1 | 10/2005 | Terek et al. | |
| 2006/0036655 A1 | 2/2006 | Lastovica | |
| 2008/0046444 A1 | 2/2008 | Fachan et al. | |
| 2008/0247729 A1 | 10/2008 | Park | |
| 2009/0064160 A1 | 3/2009 | Larson et al. | |
| 2009/0094236 A1 | 4/2009 | Renkes et al. | |
| 2009/0254532 A1 | 10/2009 | Yang et al. | |
| 2009/0287737 A1 | 11/2009 | Hammerly | |
| 2010/0082545 A1 | 4/2010 | Bhattacharjee et al. | |
| 2010/0088309 A1 | 4/2010 | Petculescu et al. | |
| 2010/0281005 A1 | 11/2010 | Carlin et al. | |
| 2010/0287143 A1 | 11/2010 | Di Carlo et al. | |
| 2011/0087854 A1 | 4/2011 | Rushworth et al. | |
| 2011/0145835 A1 | 6/2011 | Rodrigues et al. | |
| 2011/0153566 A1 | 6/2011 | Larson et al. | |
| 2011/0161379 A1* | 6/2011 | Grund | G06F 17/30312 707/812 |
| 2011/0252000 A1 | 10/2011 | Diaconu et al. | |
| 2011/0302143 A1 | 12/2011 | Lomet | |
| 2012/0011106 A1 | 1/2012 | Reid et al. | |
| 2012/0047126 A1 | 2/2012 | Branscome et al. | |
| 2012/0102006 A1 | 4/2012 | Larson et al. | |
| 2012/0137081 A1 | 5/2012 | Shea | |
| 2012/0179877 A1 | 7/2012 | Shriraman et al. | |
| 2012/0191696 A1 | 7/2012 | Renkes et al. | |
| 2012/0197868 A1* | 8/2012 | Fauser | G06F 17/30286 707/714 |
| 2012/0233438 A1 | 9/2012 | Bak et al. | |
| 2012/0265728 A1 | 10/2012 | Plattner et al. | |
| 2012/0284228 A1 | 11/2012 | Ghosh et al. | |
| 2013/0054936 A1 | 2/2013 | Davis | |
| 2013/0091162 A1 | 4/2013 | Lewak | |
| 2013/0097135 A1 | 4/2013 | Goldberg | |
| 2013/0117247 A1 | 5/2013 | Schreter et al. | |
| 2013/0275365 A1* | 10/2013 | Wang | G06F 17/30592 707/602 |
| 2013/0346378 A1 | 12/2013 | Tsirogiannis et al. | |
| 2014/0025651 A1 | 1/2014 | Schreter | |
| 2014/0101093 A1 | 4/2014 | Lanphear et al. | |
| 2014/0214334 A1 | 7/2014 | Plattner et al. | |
| 2014/0279930 A1 | 9/2014 | Gupta et al. | |
| 2014/0279961 A1 | 9/2014 | Schreter et al. | |
| 2015/0039573 A1 | 2/2015 | Bhattacharjee et al. | |
| 2015/0089125 A1 | 3/2015 | Mukherjee et al. | |
| 2015/0142819 A1 | 5/2015 | Florendo et al. | |
| 2015/0363167 A1* | 12/2015 | Kaushik | G06F 17/30315 707/753 |
| 2016/0103860 A1 | 4/2016 | Bhattacharjee et al. | |
| 2016/0125022 A1 | 5/2016 | Rider et al. | |
| 2016/0147445 A1 | 5/2016 | Schreter et al. | |
| 2016/0147447 A1 | 5/2016 | Blanco et al. | |
| 2016/0147448 A1 | 5/2016 | Schreter et al. | |
| 2016/0147449 A1 | 5/2016 | Andrei et al. | |
| 2016/0147457 A1 | 5/2016 | Legler et al. | |
| 2016/0147459 A1 | 5/2016 | Wein et al. | |
| 2016/0147617 A1 | 5/2016 | Lee et al. | |
| 2016/0147618 A1 | 5/2016 | Lee et al. | |
| 2016/0147750 A1 | 5/2016 | Blanco et al. | |
| 2016/0147776 A1 | 5/2016 | Florendo et al. | |
| 2016/0147778 A1 | 5/2016 | Schreter et al. | |
| 2016/0147786 A1 | 5/2016 | Andrei et al. | |
| 2016/0147801 A1 | 5/2016 | Wein et al. | |
| 2016/0147804 A1 | 5/2016 | Wein et al. | |
| 2016/0147806 A1 | 5/2016 | Blanco et al. | |
| 2016/0147808 A1 | 5/2016 | Schreter et al. | |
| 2016/0147809 A1 | 5/2016 | Schreter et al. | |
| 2016/0147811 A1 | 5/2016 | Eluri et al. | |
| 2016/0147812 A1 | 5/2016 | Andrei et al. | |
| 2016/0147813 A1 | 5/2016 | Lee et al. | |
| 2016/0147814 A1 | 5/2016 | Goel et al. | |
| 2016/0147819 A1 | 5/2016 | Schreter et al. | |
| 2016/0147820 A1 | 5/2016 | Schreter | |
| 2016/0147821 A1 | 5/2016 | Schreter et al. | |
| 2016/0147834 A1 | 5/2016 | Lee et al. | |
| 2016/0147858 A1 | 5/2016 | Lee et al. | |
| 2016/0147859 A1 | 5/2016 | Lee et al. | |
| 2016/0147861 A1 | 5/2016 | Schreter et al. | |
| 2016/0147862 A1 | 5/2016 | Schreter et al. | |
| 2016/0147904 A1 | 5/2016 | Wein et al. | |
| 2016/0147906 A1 | 5/2016 | Schreter et al. | |
| 2016/0275078 A1* | 9/2016 | Attaluri | G06F 17/30498 |

OTHER PUBLICATIONS

"HANA Persistence: Shadow Pages." Jun. 2013. *Yeditepe Üniversitesi Bilgisayar Mühendisliği Bölümü*. Web. Apr. 21, 2016. <http://cse.yeditepe.edu.tr/~odemir/spring2014/cse415/Persistency.pptx>.

"NBit Dictionary Compression," Sybase, May 23, 2013. Web. Mar. 15, 2017 <http://infocenter.sybase.com/help/index.jsp?topic=/com.sybase.infocenter.dc1777.1600/doc/html/wil1345808527844.html>.

"Optimistic concurrency control." Wikipedia: The Free Encyclopedia. Wikimedia Foundation, Inc., Jul. 19, 2014. Web. Mar. 3, 2016.

Ailamaki, et al., "Weaving Relations for Cache Performance," Proceedings of the the Twenty-Seventh International Conference on Very Large Data Bases, Sep. 11-14, Orlando, FL, Jan. 1, 2001.

Brown, E. et al. "Fast Incremental Indexing for Full-Text Information Retrieval." *VLDB '94 Proceedings of the 20th International Conference on Very Large Data Bases*. San Francisco: Morgan Kaufmann, 1994.

Hector Garcia-Molina, et al., "Database Systems The Second Complete Book Second Edition—Chapter 13—Secondary Storage Management," *Database Systems the Complete Book, second edition*, Jun. 15, 2008.

Jens Krueger et al. "Main Memory Databases for Enterprise Applications." Industrial Engineering and Engineering Management (IE &EM), 2011 IEEE 18th International Conference on, IEEE, Sep. 3, 2011 (Sep. 3, 2011), pp. 547-557, XP032056073.

Lemke, Christian, et al. "Speeding Up Queries in Column Stores." *Data Warehousing and Knowledge Discovery Lecture Notes in Computer Science* (2010): 117-29. Web. Apr. 21, 2016.

Lu, Andy. "SAP HANA Concurrency Control." *SAP Community Network*. Oct. 28, 2014. Web. Apr. 22, 2016. <http://scn.sap.com/docs/DOC-57101>.

(56) References Cited

OTHER PUBLICATIONS

Mumy, Mark. "SAP Sybase IQ 16.0 Hardware Sizing Guide." *SAP Community Network*. May 12, 2013. Web. Apr. 21, 2016. <http://www.sdn.sap.com/irj/scn/go/portal/prtroot/docs/library/uuid/c0836b4f-429d-3010-a686-c35c73674180?QuickLink=index&overridelayout=true&58385785468058>.

\* cited by examiner

| Page Header | Page No. Starting RowID | Row Count Column Count | Column Info | ... | Column Info |
|---|---|---|---|---|---|
| | | | Column 1 | Column 2 | Column 3 ... |

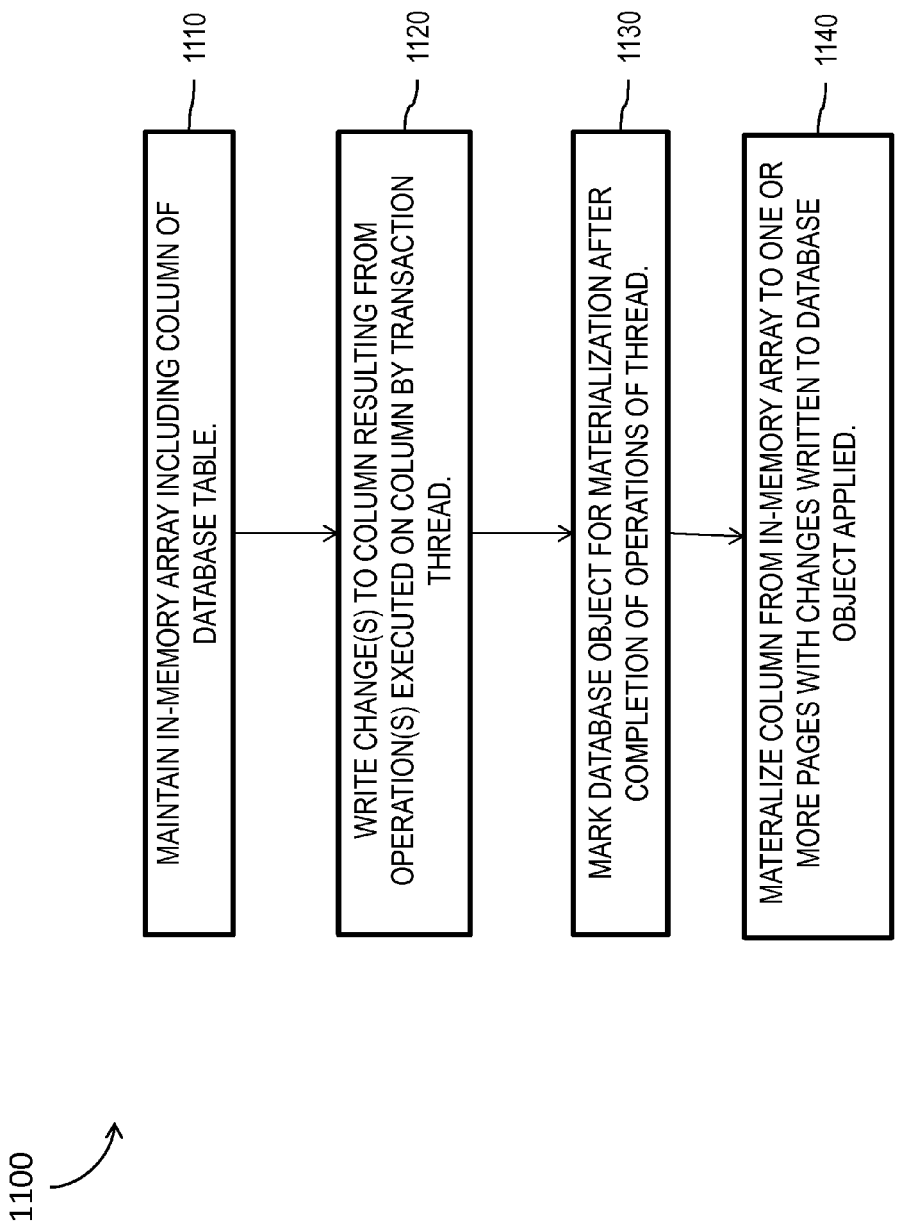

FULL AND PARTIAL MATERIALIZATION OF DATA FROM AN IN-MEMORY ARRAY TO AN ON-DISK PAGE STRUCTURE

CROSS-REFERENCE TO RELATED APPLICATION

The current subject matter is related to co-owned, pending U.S. patent application Ser. No. 14/553,950 filed on 25 Nov. 2014, the contents of which are hereby fully incorporated by reference.

TECHNICAL FIELD

This disclosure relates generally to database storage and, in particular, to the dual storage of data using an in-memory array and an on-disk page structure.

BACKGROUND

Database sizes supported by commercially available database management systems (DBMS) continue to grow as the availability and cost per unit storage of disk-based storage and system memory increases. In general, a database can feature on-disk storage of data, in which data records are stored in one or more tables or other database structures on one or more devices of a persistent storage (e.g. hard disks, optical storage, solid state storage, or the like) and read into main system memory as needed to respond to queries or other database operations. Alternatively, a database can feature in-memory storage of data, in which data records are stored in main system memory. As costs of main system memory continue to decrease, the feasibility of significant use of in-memory features increases. However, data capacity requirements of database systems also continue to increase. As such, hybrid approaches that involve features of both in-memory and on-disk systems are also advantageous.

SUMMARY

In one non-limiting aspect, a method includes maintaining an in-memory array in main system memory of the at least one computing system, where the in memory array includes a column of a database table. The method further includes writing one or more changes to the column resulting from one or more operations executed on the column by a transaction thread comprising a plurality of operations to a database object associated with the column, and marking the database object for materialization upon completion of all of the plurality of operations of the transaction thread. Based on the marking the column is materialized from the in-memory array to one or more pages stored on a persistent storage. The materializing also includes applying the one or more changes written in the database object. The one or more pages include one or more blocks for storing the column.

In optional variations, one or more of the following features can be included in any feasible combination. A method can further include allocating the one or more pages before the materializing. In such an approach, The marking can be performed by the transaction thread, and the allocating and the materializing can be performed by a materialization thread. Furthermore, the materializing can consolidate one or more intermediate rollovers resulting from the transaction thread into a single rollover. In another approach, the marking and the allocating can be performed by the transaction thread, and the materializing can be performed by a materialization thread. The materializing can optionally be performed in accordance with a predetermined time interval.

The materializing can include persisting one or more metadata values and one or more data values from the in-memory array to the one or more blocks of the one or more pages. The persisting can be iteratively performed at a fragment level of the in-memory array, at a column level of the in-memory array, and at a dictionary level of the in-memory array. The one or more metadata values can include one or more of a row count, an encoding type, a bit size, a value count, and a number of blocks, and the one or more data values can include one or more of a consolidated column data array, a column data value, and a dictionary value array. The transaction thread can include a data manipulation language thread.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated herein and constitute a part of this specification, show certain aspects of the subject matter disclosed herein and, together with the description, help explain some of the principles associated with the subject matter disclosed herein. In the drawings.

FIG. 9 is a schematic representation of a page;

FIG. 11 is a process flow diagram for materializing data from an in-memory array to one or more pages in persistence.

Like reference symbols in the various drawings indicate like elements.

DETAILED DESCRIPTION

Figure 1:
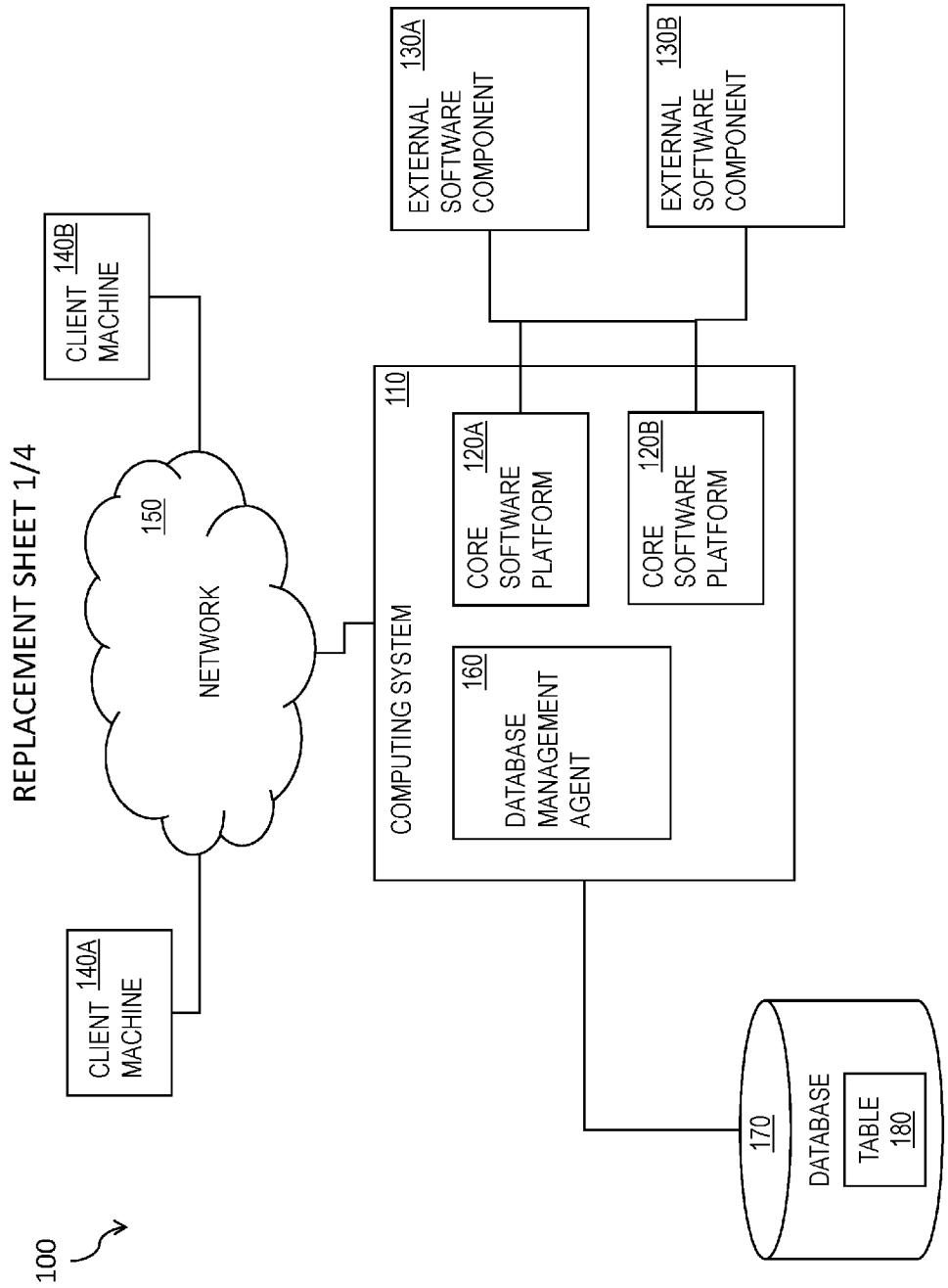
FIG. 1 is a diagram illustrating features of a business software system architecture.

The current subject matter can be implemented as a core software platform of an enterprise resource planning (ERP) system, other business software architecture, or other data-intensive computing application or software architecture that runs on one or more processors that are under the control of a specific organization. This arrangement can be very effective for a large-scale organization that has very sophisticated in-house information technology (IT) staff and for whom a sizable capital investment in computing hardware and consulting services required to customize a commercially available business software solution to work with organization-specific business processes and functions is feasible. FIG. 1 shows a diagram 100 of a system consistent with such an implementation. A computing system 110 can include one or more core software platform modules 120A,B providing one or more features of the business software system. The computing system can also aggregate or otherwise provide a gateway via which users can access functionality provided by one or more external software components 130 A,B. Client machines 140 A,B can access the computing system, either via a direct connection, a local terminal, or over a network 150 (e.g. a local area network, a wide area network, a wireless network, the Internet, or the like).

The current subject matter can be implemented as a core software platform of an enterprise resource planning (ERP) system, other business software architecture, or other data-intensive computing application or software architecture that runs on one or more processors that are under the control of a specific organization. This arrangement can be very effective for a large-scale organization that has very sophisticated in-house information technology (IT) staff and for whom a sizable capital investment in computing hardware and consulting services required to customize a commercially available business software solution to work with organization-specific business processes and functions is feasible. FIG. 1 shows a diagram 100 of a system consistent with such an implementation. A computing system 110 can include one or more core software platform modules 120 providing one or more features of the business software system. The computing system can also aggregate or otherwise provide a gateway via which users can access functionality provided by one or more external software components 130. Client machines 140 can access the computing system, either via a direct connection, a local terminal, or over a network 150 (e.g. a local area network, a wide area network, a wireless network, the Internet, or the like).

A database management agent 160 or other comparable functionality can access a database management system 170 that stores and provides access to data (e.g. definitions of business scenarios, business processes, and one or more business configurations as well as data, metadata, master data, etc. relating to definitions of the business scenarios, business processes, and one or more business configurations, and/or concrete instances of data objects and/or business objects that are relevant to a specific instance of a business scenario or a business process, and the like. The database management system 170 can include at least one table 180 and additionally include parallelization features consistent with those described herein.

Figure 2:
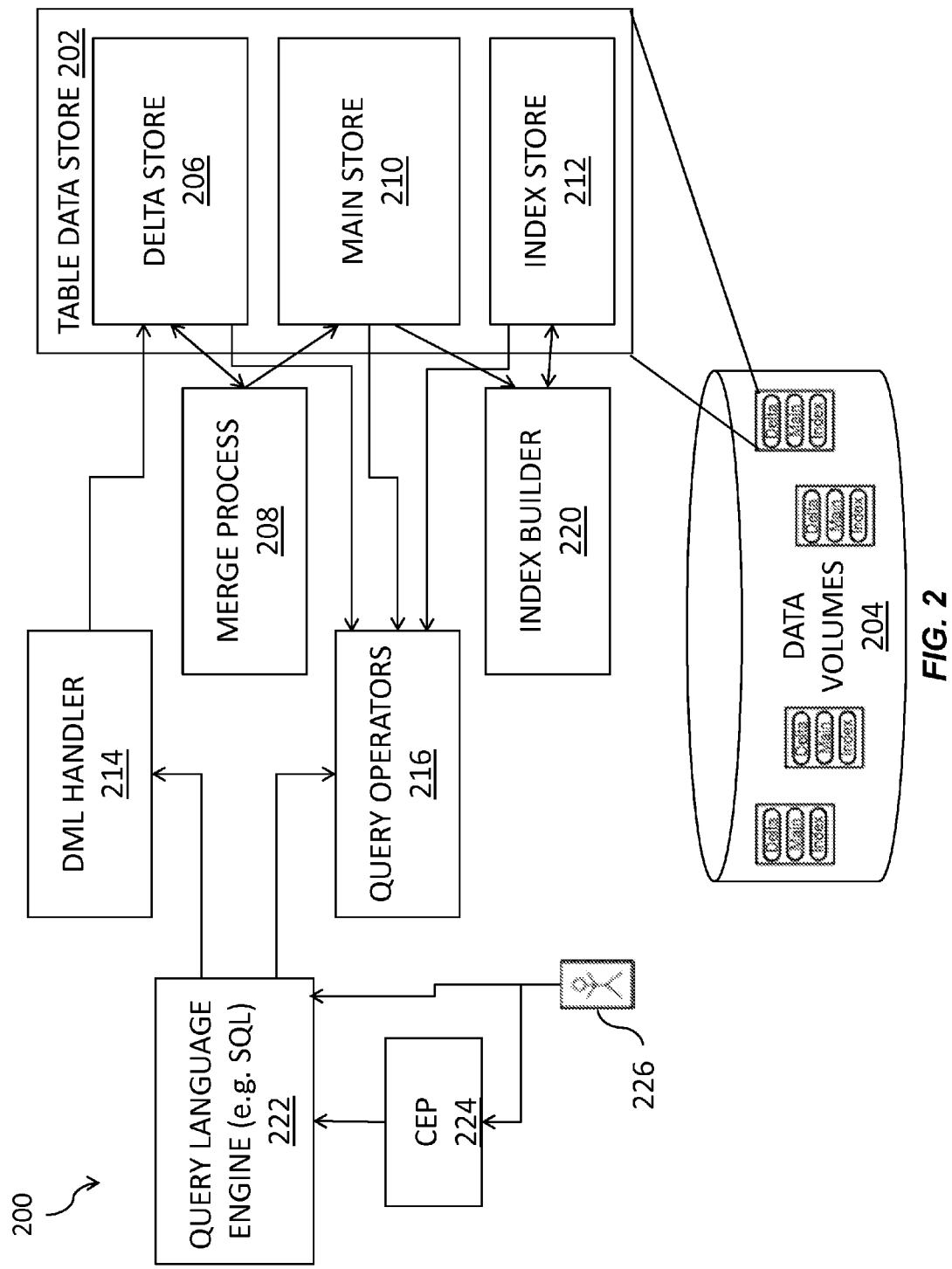
FIG. 2 is another diagram illustrating features of a business software system architecture.

FIG. 2 shows a block diagram of an architecture 200 illustrating features that can be included in a database or database management system consistent with implementations of the current subject matter. A table data store 202, which can be retained among a plurality of data volumes 204, can include one or more of a delta store 206 (e.g. a paged delta part, which can optionally be OLTP optimized and can optionally include a merge process 208), an index store 212 (e.g. one or more segmented indices), and a main store 210. The main store 210 can include a main part that is fragmented consistent with features described herein.

Figure 3:
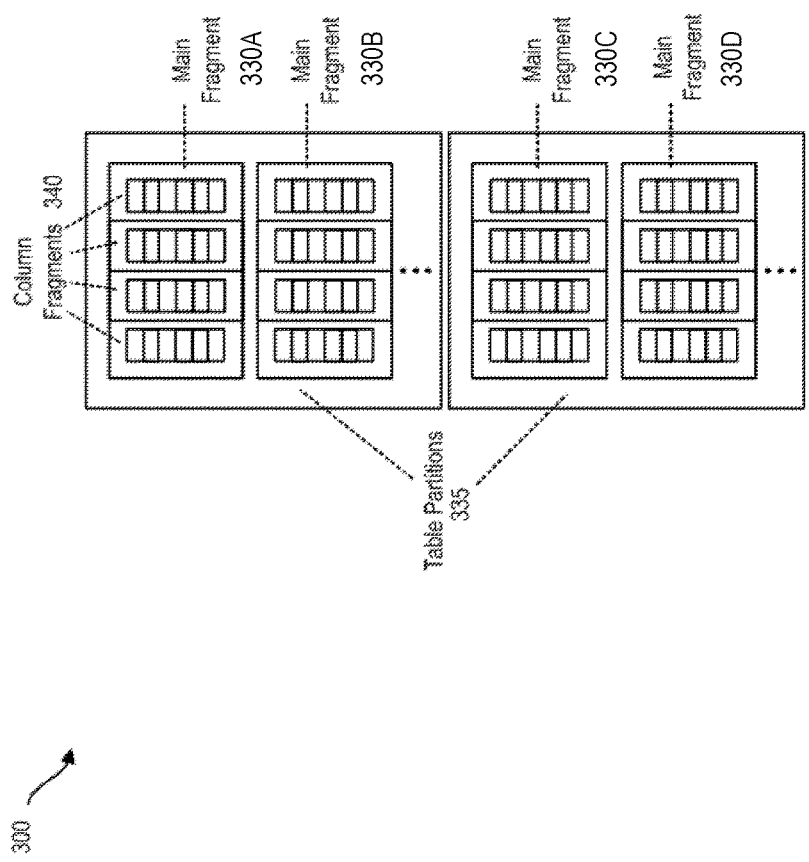
FIG. 3 is a schematic representation of fragments stored in a main store.

To achieve a best possible compression and also to support very large data tables, a main part of the table can be divided into one or more fragments. FIG. 3 shows a schematic representation 300 of the various fragments stored in main store 210. One or more main fragments or fragments 330A,B,C,D can be used for each table or column of a database. Small, manageable tables can be represented with a single fragment. Very large tables can be split into two or more table partitions 335. Each table partition may, in turn, include two or more fragments 330A,B,C,D. Fragments 330A,B,C,D can be horizontal slices of the table to which they belong. Each fragment 330A,B,C,D can include one or more column fragments 340. Each column fragment 340 can have its own dictionary and value ID array consistent with the features described herein.

Fragments 330A,B,C,D can advantageously be sufficiently large to gain maximum performance due to optimized compression of the fragment and high in-memory performance of aggregations and scans. Conversely, such fragments can be sufficiently small to load a largest column of any given fragment into memory and to sort the fragment in-memory. Fragments can also be sufficiently small to be able to coalesce two or more partially empty fragments into a smaller number of fragments. As an illustrative and non-limiting example of this aspect, a fragment can contain one billion rows with a maximum of 100 GB of data per column. Other fragment sizes are also within the scope of the current subject matter. A fragment can optionally include a chain of pages. In some implementations, a column can also include a chain of pages. Column data can be compressed, for example using a dictionary and/or any other compression method. Table fragments can be materialized in-memory in contiguous address spaces for maximum performance. All fragments of the database can be stored on-disk, and access to these fragments can be made based on an analysis of the data access requirement of a query.

Referring again to FIG. 2, other parts of the architecture 200 can include a data manipulation language (DML) handling module or similar functionality 214, one or more query handling modules or similar functionality 216 (e.g. including multi-version concurrency control), an index builder 220 that supports the index store 212, a query language engine 222 (which can, for example, be a SQL engine), a complex events processing module (e.g. an event handler, a stream processing module, etc.) 224 for receiving inputs from a user 226, and the like.

Figure 4:
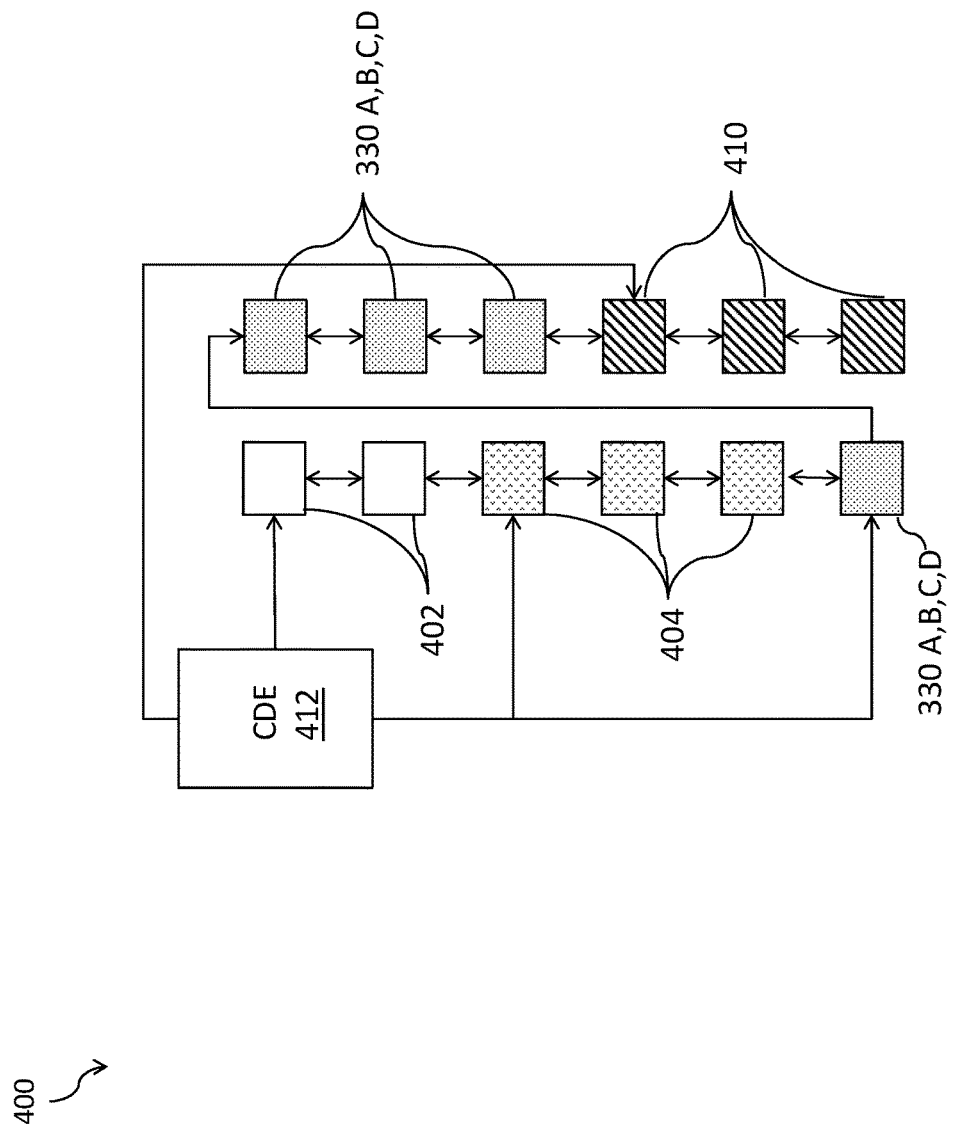
FIG. 4 is a diagram illustrating features of a unified table container page chain.

FIG. 4 shows a block diagram illustrating an example of a unified table container page chain 400. As described above, each fragment can optionally include a chain of pages. In general, a container can be represented as a page chain. A page chain can generally be characterized as a set of pages that are linked in a given order. The term pages, as used herein, refers to a basic unit of storage in a database. A page size is generally established when the database is built and typically cannot be changed. A representative page size can be on the order of 2 kB, 4 kB, 8 kB, 16 kB, or the like. Once the server is built, the value usually cannot be changed. Different types of pages can store different types of database objects. For example, data pages can store data rows or columns for a table. Index pages can store index rows for one or more levels of an index. Large object (LOB) pages can store data for text and image columns, for Java off-row columns, and the like. While FIG. 4 illustrates a single page chain 400, multiple page chains can be used. In some implementations, the multiple page chains can be arranged in accordance with a hierarchy.

Also as shown in FIG. 4, sub-chains of the page chain can be defined for a delta part, a main part, dictionaries, index segments (optionally, not shown in FIG. 2), and the like such that a "whole" of each of these entities contains one or more pages. In some implementations of the current subject matter, a delta part can include both "hot" delta fragments 402 and "cold" delta fragments 404, which can be stored separately. The main part can also be subdivided into main fragments 330. Pages containing dictionary-compressed columnar data 410 can refer to pages containing dictionaries for them. Individual table parts can be loaded into main memory on-demand. A merge process can be decoupled from transaction handling such that a merge process can be executed at recovery time (e.g. during log replay). A page chain, such as the example shown in FIG. 4, can be initiated by a container directory entry (CDE) 412.

A single RowID space can be used across pages in a page chain. A RowID, which generally refers to a logical row in the database, can be used to refer to a logical row in an in-memory portion of the database and also to a physical row in an on-disk portion of the database. A row index typically refers to physical 0-based index of rows in the table. A 0-based index can be used to physically address rows in a contiguous array, where logical RowIDs represent logical order, not physical location of the rows. In some in-memory database systems, a physical identifier for a data record position can be referred to as a UDIV or DocID. Distinct from a logical RowID, the UDIV or DocID (or a comparable parameter) can indicate a physical position of a row (e.g. a data record), whereas the RowID indicates a logical position. To allow a partition of a table to have a single RowID and row index space consistent with implementations of the current subject matter, a RowID can be assigned a monotonically increasing ID for newly-inserted records and for new versions of updated records across fragments. In other words, updating a record will change its RowID, for example, because an update is effectively a deletion of an old record (having a RowID) and insertion of a new record (having a new RowID). Using this approach, a delta store of a table can be sorted by RowID, which can be used for optimizations of access paths. Separate physical table entities can be stored per partition, and these separate physical table entities can be joined on a query level into a logical table.

When an optimized compression is performed during a columnar merge operation to add changes recorded in the delta store to the main store, the rows in the table are generally re-sorted. In other words, the rows after a merge operation are typically no longer ordered by their physical row ID. Therefore, stable row identifier can be used consistent with one or more implementations of the current subject matter. The stable row identifiers can optionally be a logical RowID. Use of a stable, logical (as opposed to physical) RowID can allow rows to be addressed in REDO/UNDO entries in a write-ahead log and transaction undo log. Additionally, cursors that are stable across merges without holding references to the old main version of the database can be facilitated in this manner. To enable these features, a mapping of an in-memory logical RowID to a physical row index and vice versa can be stored. In some implementations of the current subject matter, a RowID column can be added to each table. The RowID column can also be amenable to being compressed in some implementations of the current subject matter.

Figure 5:
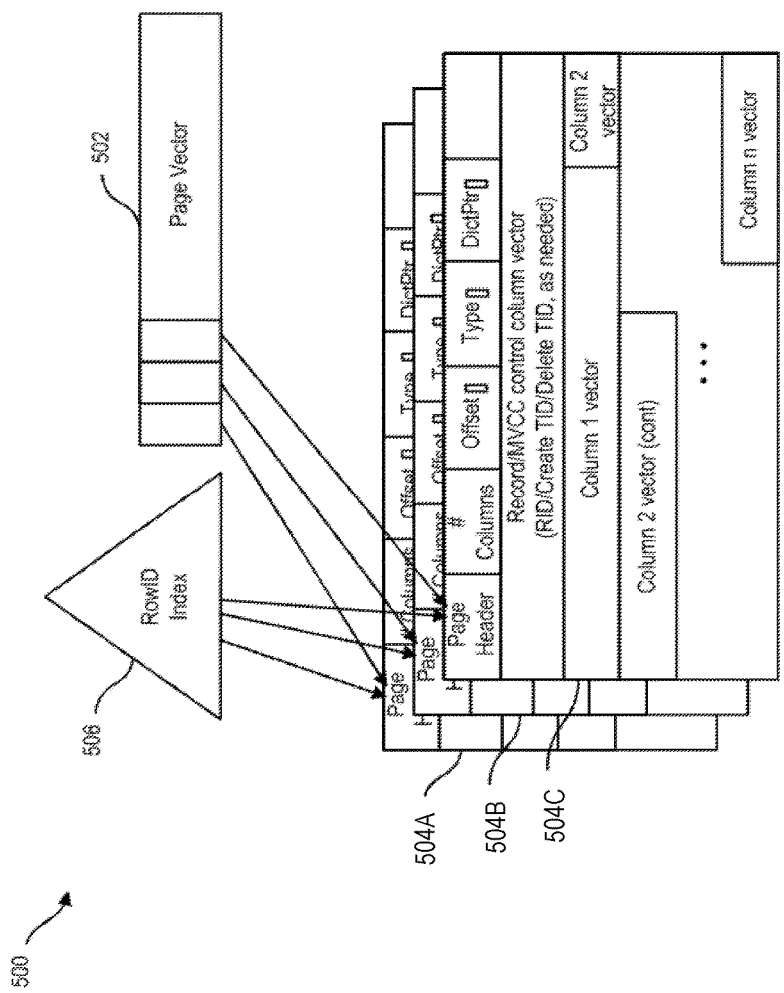
FIG. 5 is a diagram illustrating features of a unified table delta.

FIG. 5 shows a block diagram of a unified table delta 500 consistent with one or more implementations of the current subject matter. In some examples, a "hot" and "cold" delta approach can be used in which uncompressed data are retained in the "hot" delta part, while dictionary-compressed data are retained in the "cold" delta part with a mini-merge performed between the hot and cold parts. Such a delta part can be considered as a single container. As shown in FIG. 5, each delta sub-chain can have its own transient structure. In other words, a separate structure can be used for each delta. A page vector 502 can hold page handles to individual pages 504 and can allow a fast iteration over the pages 504A,B,C (for example as part of a column or table scan). A page handle to an individual page 504A,B,C can include a pin or the like held in memory. As used herein, the term "pin" refers to holding a particular data page (which may also have been stored on disk) in memory. As an example, if a page is not pinned, it can be cleared from memory. Pinning is typically done on data pages being actively accessed so as to avoid potential performance degradations associated with reading the page from disk into memory.

A RowID index 506 can serve as a search structure to allow a page 504A,B,C to be found based on a given interval of RowID values. The search time can be on the order of log n, where n is very small. The RowID index can provide fast access to data via RowID values. For optimization, "new" pages can have a 1:1 association between RowID and row index, so that simple math (no lookup) operations are possible. Only pages that are reorganized by a merge process need a RowID index in at least some implementations of the current subject matter.

Figure 6:
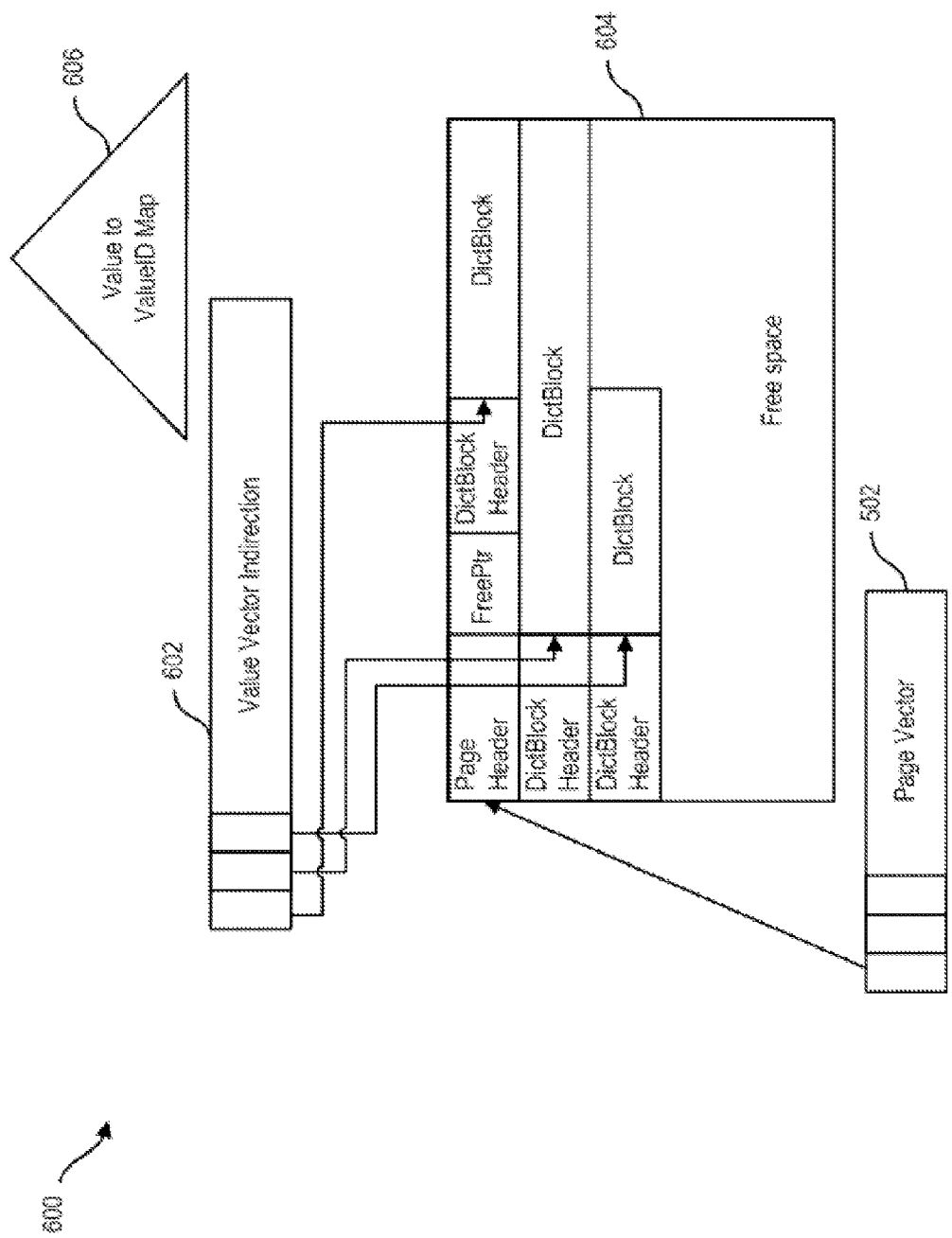
FIG. 6 is a diagram illustrating features of a unified table unsorted dictionary.

FIG. 6 shows a block diagram of a unified table unsorted dictionary 600. Consistent with one or more implementations of the current subject matter, column data in a delta part can use unsorted dictionaries. A transient structure can be provided per delta column dictionary. The page vector 502 can handle pinning of pages in memory. Direct access can be provided via a pointer from other structures. A value vector indirection 602 can allow a same number of values per dictionary block 604. This capability can support an order of 1 performance cost for lookup of a value by ValueID. A dictionary can assign a unique ValueID (typically a numeric value) to each unique value such that the unique values (which are typically larger in memory size than the ValueID) can be stored once rather than multiple times. A value array is a structure used by the dictionary to retrieve values given a ValueID or vice versa. This technique, which can reduce the amount of memory needed to store a set of values where the values are not unique, is typically referred to as dictionary compression. A Value to ValueID map 606 can support hash or B-tree sizes on the order of 1 or on the order of log n for lookup of ValueID by value. A B-tree is a tree data structure that keeps data sorted and allows searches, sequential access, insertions, and deletions in logarithmic time. This capability can be necessary for dictionary compression. A B-tree can be better for range scans but can be more expensive to maintain.

Figure 7:
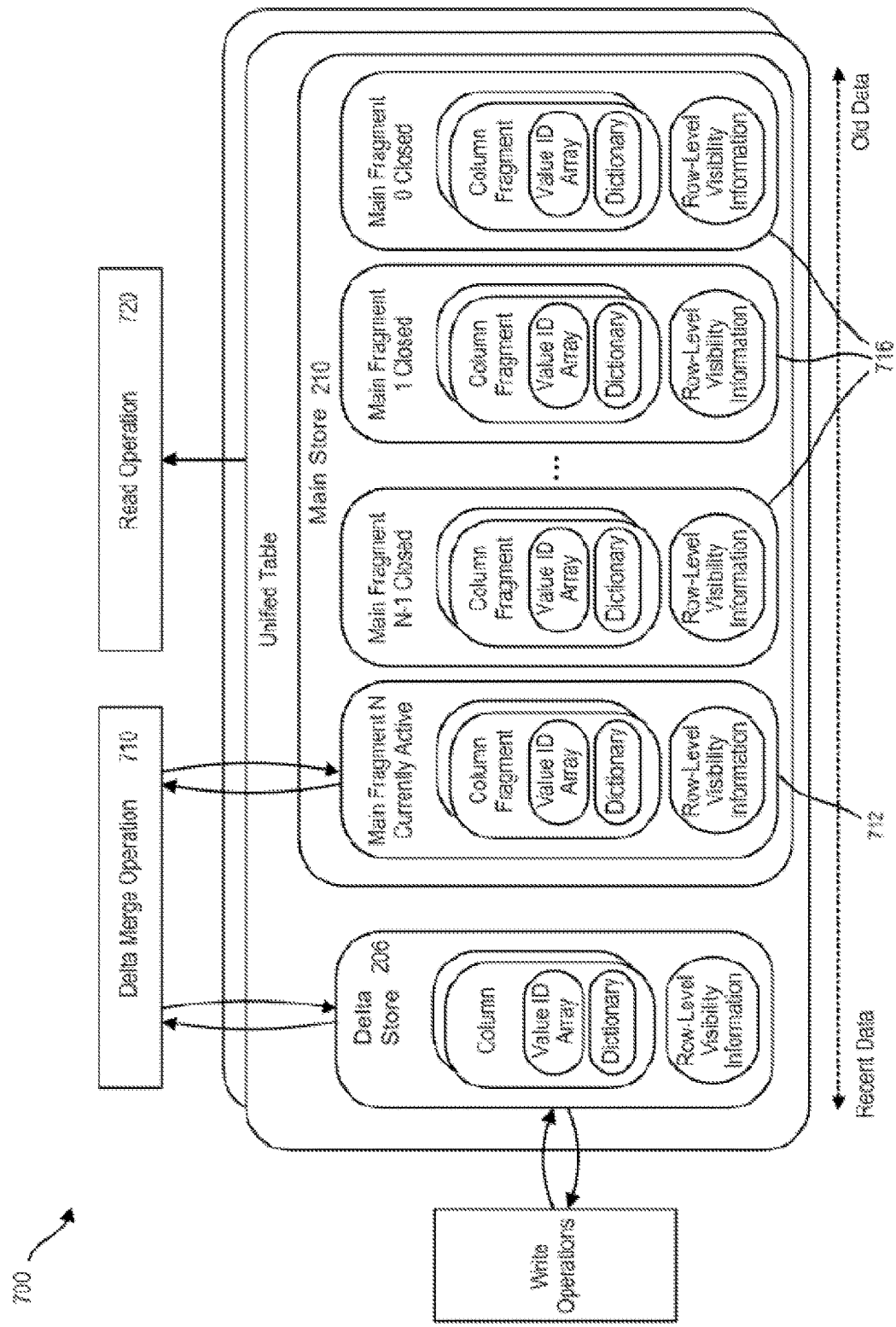
FIG. 7 is a functional block diagram illustrating a delta merge operation and a read operation using a unified table.

FIG. 7 shows a functional block diagram 700 for performing a delta merge operation 710 on a unified table. New transactions or changes can initially be written into delta store 206. Main store 210 can include one active fragment 712 and one or more closed fragments 716. When updates are merged from delta store 206 into the main store 210, existing records in the closed fragments 716 cannot be changed. Instead, new versions of the records can be added to the active fragment 712, and old versions can be marked as invalid.

Functional block diagram 700 also illustrates a read operation 720. Generally, read operations can have access to all fragments (i.e., active fragment 712 and closed fragments 716). Read operations can be optimized by loading only the fragments that contain data from a particular query. Fragments that do not contain such data can be excluded. In order to make this decision, container-level metadata (e.g., a minimum value and/or a maximum value) can be stored for each fragment. This metadata can be compared to the query to determine whether a fragment contains the requested data.

Figure 8:
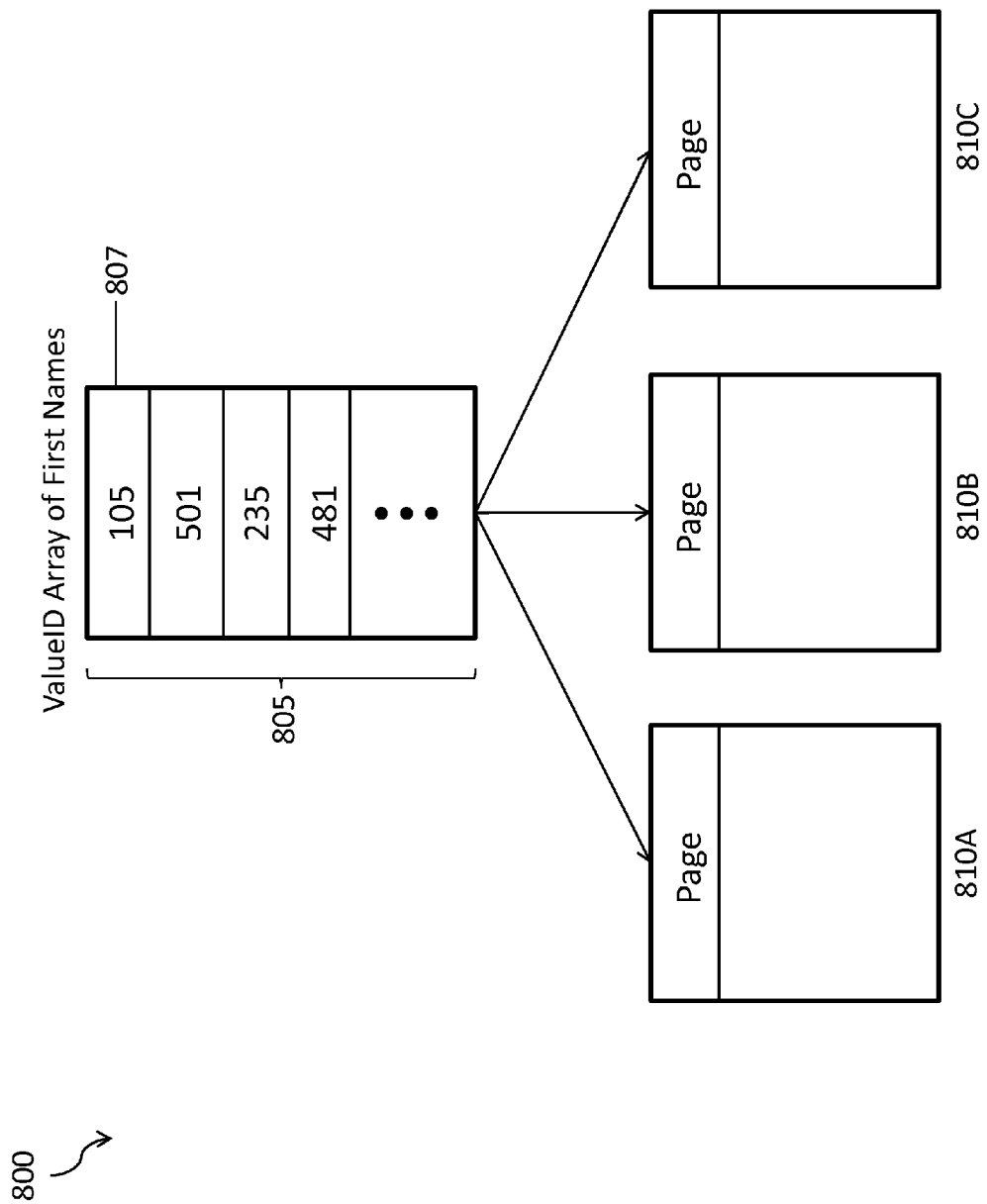
FIG. 8 is a functional block diagram of a system architecture having a memory array and an on-disk page structure.

FIG. 8 is a functional block diagram of a system architecture 800 consistent with implementations of the current subject matter. System 800 combines the benefits of a traditional disk/page based system with the fast memory access available in an in-memory database system, such as SAP's High Performance Analytic Appliance (HANA) database system. System 800 can include an in-memory array, such as memory array 805, that can store data associated with a column of a table. In some implementations, the memory array 805 can include contiguous blocks of memory addresses. While the memory array 805 is illustrated as having a single column in the implementation of FIG. 8, any number of columns can be included. Each memory address can include a value. This value can be a ValueID that is representative of a data value, such as a first name as illustrated in the implementation of FIG. 8. The memory array 805 can also include a starting memory address associated with the first element 807 in the memory array that can be stored as metadata. Once the starting memory address is known, transaction threads can quickly scan, search, or read the memory array 805 as each element in the memory array is sequentially stored at adjacent memory addresses.

Reading and writing individual pages (or blocks of rows on a given page), however, can be problematic when some of the data is not in the memory array 805. In an in-memory database system, such as HANA, the in-memory array can be persisted to disk in a serial manner using a series of pages. Because this data is serially written to disk by breaking the data up across one or more pages, there may be no correlation between the data and the page that it is on. As such, random access to a particular data value or ValueID may not be supported. If, for example, only a specific ValueID is needed during a read or write operation, the entire sequence of pages may be loaded into the in-memory array which can be time consuming.

In order to overcome this deficiency, implementations of the current subject matter mirror the memory array 805 into a separate page based layout, such as pages 810A, 810B, and 810C, when persisting the memory array to persistent storage. Using pages 810A, 810B, and 810C allows system 800 to take advantage of the disk optimized features associated with a disk/page based system. Pages 810A, 810B, and 810C support a lookup mechanism that can track the location of pages in memory. This lookup mechanism can be helpful because pages 810A, 810B, and 810C may not be sequentially stored in memory. In some implementations, this lookup mechanism can use a hash table that correlates page numbers and the contents of each page to memory addresses. Because individual pages can be easily located via this lookup mechanism, system 800 can load individual pages or blocks of rows on individual pages into the memory array 805. This capability can be useful during a system restore process. If, for example, a specific row of data or a subset of rows needs to be restored to the memory array 805 after the system 800 shuts down, this subset of rows can be copied and loaded from at least one of pages 810A, 810B, and 810C. Unlike an in-memory database system which may require all of the rows on pages 810A, 810B, and 810C to be loaded to the memory array 805, implementations of the instant subject matter support random access of data. As such, only the desired subset of rows may be loaded into the memory array 805. Mirroring the memory array 805 into pages 810A, 810B, and 810C paginates the memory array in a manner that supports random access of individual pages and individual rows on pages without requiring the system 800 to serialize all of the data when loading the data back to the memory array.

FIG. 9 illustrates a schematic representation of a page 900. Page 900 includes a page header 905 that provides general information regarding the page. This information can include, for example, the page number, the RowID value of the first row, the number of rows and/or columns on the page 900, and the like. Page 900 can also include several fields that hold column information 910. Generally, each column has its own column information field 910. The column information field 910 can include information representative of the column including, for example, a column identifier, the type of encoding present in the column, the location of the corresponding column data on the page, and the like. Page 900 can also include blocks 915 of column data. Because column data blocks 915 store data of varying size, the column data blocks can also vary in size. In some implementations, page 900 may not include any blocks 915 of column data at all. In these implementations, the metadata in the column information field 910 may be sufficient to reconstruct the data in memory. This scenario can occur when all of the values in the column are set to null or 0. This scenario can also occur when the column information field 910 of a column indicates that an identity property applies to the column. As described above with respect to FIG. 8, the data (i.e., the ValueIDs) in memory array 805 can be copied to pages 810A, 810B, and 810C and stored at various row positions as indicated by column data blocks 915. When the identity property applies, the ValueID may be equal to the row position. For example, a ValueID of 1 may be stored at row position 1 on the page, a ValueID of 2 may be stored at row position 2 on the page, and so on. Because the ValueID is equal to the row position, there may be no need to store the ValueID as it can be reconstructed from the row position. Consequently, the corresponding block 915 of column data may be empty.

The contents of column data blocks 915 can be similar to the contents of memory array 805. As described above with respect to dictionary 600, a dictionary can assign a unique ValueID to each dictionary entry. This unique ValueID is typically a numeric value represented by a string of bits. The number of bits used to represent the ValueID (i.e., the N-bit value ID) can depend on the number of unique values in the dictionary. Like dictionary 600, the data stored in memory array 805 can also include N-bit value IDs. When the data values in memory array 805 are copied to pages 810A, 810B, and 810C, the data can be copied directly using its native N-bit encoded values. By keeping these data values in their native N-bit form at both the memory array 805 and the pages 810A, 810B, and 810C, no additional processing or translation is required to convert these data values between different formats (e.g., expanding and compressing the data values to/from a 32-bit integer format). This configuration can allow system 800 to reduce or minimize the amount of time associated with the copying process.

A bit copy mechanism can be used to copy data from memory array 805 to pages 810A, 810B, and 810C. Memory copies generally start at byte boundaries. During these operations, copying may begin at a source byte and end at a destination byte. Sometimes, however, the data to be copied may be located within the middle of a byte or span multiple bytes. For example, in the implementation of FIG. 8, ValueIDs 105, 501, 235, and 481 may be located within a contiguous block within memory array 805 that begins in the middle of a byte. If, for example, copying is limited to byte boundaries, then these values may be truncated. Rather than limit data copying to the byte boundaries, the bit copy mechanism can start the copying process anywhere within the byte. For example, if it is known that ValueIDs 105, 501, 235, and 481 start and end at particular bits, data copying can be limited to these bits. In some implementations, these start and end bits may coincide with the start and end points of a memory byte or may reside within one or more different memory bytes. Bit copy can also facilitate N-bit encoding of ValueIDs. Pages can contain a range of row positions (e.g., a page may have row positions 100 to 200). With N-bit encoding, row position 100 may begin several bits into a given byte or may span multiple bytes. The bit copy mechanism copies row positions 100 to 200 even if these row positions do not coincide with byte boundaries.

Data materialization refers to the process by which data values are persisted from a memory layout (such as memory array 805) to a page layout (such as pages 810A, 810B, and 810C). When a transaction thread is trying to insert a data value into a table, the transaction thread can write this data value directly into memory array 805. In order to later copy or persist this data value to one of pages 810A, 810B, and 810C, one or more blocks on these pages need to be reserved. Reserving a block on a page allows data values to be copied to the block at a later time. The instant subject matter discloses different processes for reserving or allocating blocks on a page and subsequently copying data from memory array 805 to one or more of pages 810A, 810B, and 810C. These processes include a fully deferred materialization process and a partially deferred materialization process.

The fully deferred and partially deferred materialization processes can decouple the writing of transient data to memory 805 from the writing of persistent data to pages 810A, 810B, and 810C. This decoupling is distinct from conventional materialization processes, which allocate persistent space (i.e., pages 810A, 810B, and 810C) at substantially the same time that a corresponding transient change is made at memory array 805.

In a conventional materialization process, a transaction thread, such as a DML thread, can allocate pages as it performs various operations. Making this allocation at each operation (e.g., at each DML statement), however, can result in a performance degradation. For example, as a transaction thread inserts new values into a dictionary in an in-memory array, the transaction thread can allocate and mark pages for later persistence. Performing these processes after each operation, however, can result in delays as the number of operations in the transaction thread grows. If, for example, the transaction thread includes 1,000 insertion operations (e.g., to insert new dictionary values), then the transaction thread may have to perform the above-described allocation and marking 1,000 times. This delay can be exacerbated when multiple transaction threads are allocating and marking the same page.

The fully deferred and partially deferred materialization processes described herein can reduce these performance issues by separating the transient and persistent processes. Rather than allocate and mark a page alongside each operation of the transaction thread (e.g., at each step of the DML thread), the instant subject matter waits until the completion of all transient operations before marking a database object a single time. In some implementations, this database object can be a fragment in delta store 206, which records (e.g. writes) one or more changes to the column in the in memory array resulting from one or more operations of the transaction thread. As described above with respect to FIGS. 2 and 7, new transactions or changes resulting from a transaction thread can initially be written into one or more fragments in delta store 206. After a transaction thread completes its operations, the transaction thread can mark the corresponding fragment in delta store 206 (e.g. the database object to which changes to the column maintained in the in memory array have been written) a single time to indicate the presence of a modification. Page blocks can then be allocated for the subsequent copying of data from memory array 805 to one or more of pages 810A, 810B, and 810C to reflect the changes written to the database object. The following paragraphs describe the fully deferred and partially deferred materialization processes in greater detail.

Fully Deferred Materialization.

As described above, a transaction thread (e.g., a DML thread) can mark a database object (e.g., a fragment in delta store 206) as modified after completion of its operations. These operations can be transient operations involving changes to data values stored in memory array 805. In the fully deferred materialization process, a different thread, such as a materialization thread, can detect the presence of a marked or modified object, allocate blocks and/or pages based on the marking, and materialize to the allocated blocks and/or pages the data values from memory array 805 with the one or more changes written to the database object applied to those data values.

Figure 10:
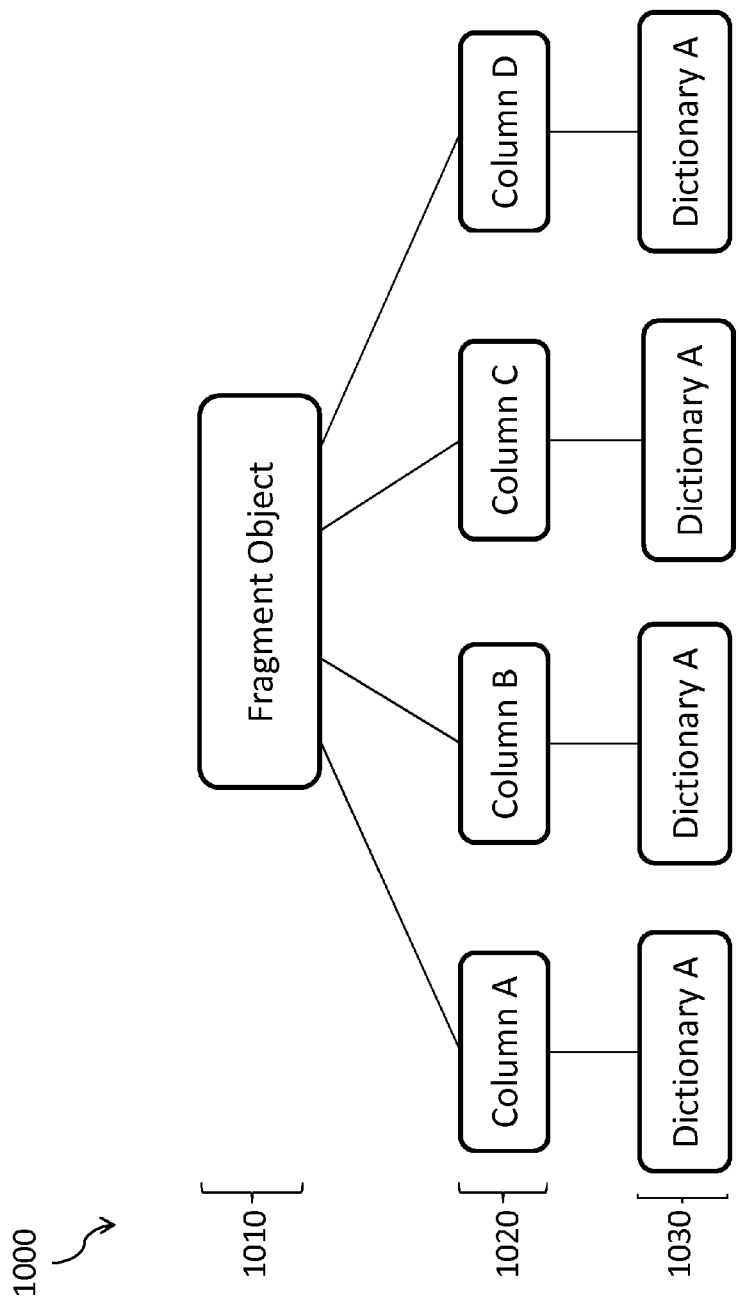
FIG. 10 is a schematic representation of an object tree.

FIG. 10 illustrates an object tree 1000. This object tree can correspond to the fragments in delta store 206. Object tree 1000 can be divided into three different hierarchical levels including a fragment object 1010, columns 1020, and dictionaries 1030. Each level of object tree 1000 can be associated with different metadata and data. For example, at fragment object 1010, metadata can include a row count, and data can include consolidated column data arrays in data pages. At columns 1020, metadata can include one or more of an encoding type and a bit size, and data can include column data arrays (e.g., value ID arrays). At dictionaries 1030, metadata can include one or more of a value count and a number of blocks, and data can include a dictionary value array. In some implementations, the materialization thread can run at predetermined intervals (e.g., once every minute).

The marking of a database object as modified can be completed by a DML thread, and this process can mark the top level object (e.g. a fragment object 1010) as modified. A lookup structure (e.g. a hash table, list, etc.) can be maintained to contain all currently marked database objects. The materialization thread can access this lookup structure to find the next marked database object, and can then traverse the hierarchy shown in FIG. 10. The materialization thread can determine the presence of a marked database object based on a change in metadata value. For example, if a transaction thread inserts a new row into memory array 805, this insertion can increase the row count associated with fragment object 1010. This change in metadata value can be associated with a marked or modified object. Upon detecting this change in metadata value, the materialization thread can allocate blocks and/or pages from one or more of pages 810A, 810B, and 810C. The materialization thread can subsequently copy the metadata data values and data values from fragment object 1010 to the allocated blocks and/or pages using the bit copy mechanism described above, for example. In some implementations, the materialization thread may only copy changed metadata values and changed data values (rather than all metadata values and all data values) from fragment object 1010 to the allocated blocks and/or pages. The materialization thread can iteratively repeat this allocation and copy process at each level of object tree 1000.

In some implementations, the operations associated with the transaction thread can affect the rollover process. A rollover may be required if the number of bits used to represent the N-bit value IDs changes (e.g., increases or decreases). During runtime, various transaction threads can insert new data records into the memory array 805. Each new data record can include, for example, a new first name value. As the number of unique first name values increases, the number of bits used to represent each corresponding N-bit value ID can also increase.

For example, a 1-bit value ID (e.g., 0 or 1) can represent two unique first name values (e.g., David and John). During runtime, a transaction thread can add two additional unique first name values (e.g., Eric and Nancy), for example. In order to accommodate the increased number of first name values, additional bits may be needed to uniquely encode each N-bit value ID. In this example, a 2-bit value ID (i.e., 00, 01, 10, or 11) can uniquely represent all four first names. Accordingly, the number of bits used to encode the N-bit value ID can increase from 1 bit to 2 bits as the number of first name values grows from two first names to four first names. This change can result in rollover that can change the formatting in one or more of pages 810A, 810B, and 810C. If, for example, the transaction thread adds a fifth first name value, then a 3-bit value ID may be needed to uniquely represent all five first names. This addition can, in turn, result in a second rollover that can change the formatting on one or more of pages 810A, 810B, and 810C.

Because the fully deferred materialization process materializes data values to persistence after completion of all transactions in the thread, this process can consolidate all intermediate rollovers into a single rollover. Continuing with the example above, the materialization thread can consolidate the effects of the first rollover (which increased the N-bit value ID from 1 bit to 2 bits) and the second rollover (which increased the N-bit value ID from 2 bits to 3 bits) into a single rollover (which increases the N-bit value ID from 1 bit to 3 bits). This consolidation can reduce code execution.

The fully deferred materialization process can result in memory allocation issues. As described above, no persistence changes are made during execution of the transaction thread. Rather, the materialization thread can allocate and persist metadata value changes and data value changes after execution of the operations in the transaction thread. Because these processes are entirely decoupled, the materialization thread may encounter an out of memory error condition if there are insufficient resources for allocation.

Once a transaction has been committed, its durability is based on the transaction log. When the system is savepointed (which happens automatically at a predetermined interval), all data for the transaction is persisted to disk and the transaction log can be trimmed. In other words, the durability of a transaction can be transferred from the transaction log to the data and dictionary pages, etc. (e.g. the items being materialized). Because of this, if it is not possible to materialize the data, it is therefore not possible to trim the transaction log and similarly not possible to savepoint the system. Accordingly, a problem with out of memory condition in this example is that it can block the savepoint of the system, which is undesirable as it can lead to longer recovery times and extra log consumption. So long as the out of memory condition occurs, it can prevent savepointing. This situation can occur even though the transaction thread has already committed the changes in memory array 805. The partially deferred materialization process described below can resolve this issue.

Partially Deferred Materialization

As described above, a transaction thread (e.g., a DML thread) can mark a database object (e.g., a fragment in delta store 206) as modified after completion of its operations on memory array 805. In the partially deferred materialization process, the transaction thread can detect the presence of a marked or modified database object and can allocate blocks and/or pages as appropriate. A separate materialization thread can materialize the data values from memory array 805 to the allocated blocks and/or pages. This process is different from the fully deferred materialization process described above. In that process, the materialization thread (rather than the transaction thread) performs the detection of a modified database object and allocation of blocks and/or pages. This shift in responsibilities can impact the out of memory error condition described above.

A transaction thread is aware that it has just modified a database object and which database object it has modified. The process of determining what has changed can occur in substantially the same manner (e.g. by traversing the hierarchy, checking metadata, etc.) as the fully deferred materialization process. The transaction thread can perform this detection after it has executed all of its operations. The transaction thread can iteratively search each level of object tree 1000 to determine whether there are any changes to any of the metadata values in the object tree. Upon detecting a change, the transaction thread can allocate blocks and/or pages. If the transaction thread is unable to allocate any blocks or pages due to an out of memory error condition, the transaction thread can throw an error to abort the transaction.

Using approaches consistent with implementations of the current subject matter, it is possible for a similar out of memory error to occur. However, using the presently described approaches, when such an error arises, persistence of the transaction has not yet been guaranteed, and as such it is acceptable to pass the error on and abort the transaction (e.g. because no durability assurances are broken by doing so). By allocating resources in this manner, the savepoint process can be guaranteed to proceed error free. Following allocation of database blocks and/or pages, the materialization thread can persist the metadata values and data values from object tree 1000 to one or more of pages 810A, 810B, and 810C using a bit copy mechanism, for example.

FIG. 11 illustrates a flowchart for materializing data from an in-memory array to one or more pages on persistent storage in accordance with the implementations described herein. At 1110, an in-memory array (e.g. in memory array 805) can be maintained to include a column of a database table.

At 1120, one or more changes to the column resulting from one or more operations executed on the column by a transaction thread that includes a plurality of operations is written to a database object associated with the column. As noted above the database object can include one or more fragments in a delta store 206.

The database object is marked for materialization at 1130 upon completion of all of the operations of the transaction thread, and at 1140, the column is materialized from the in-memory array to one or more pages stored on persistent storage with the one or more changes written to the database object applied. The one or more pages can includes one or more of pages 810A, 810B, and 810C, for example. The one or more pages can optionally be allocated before the materializing. In a fully deferred materialization process, a materialization thread can perform this allocation. In a partially deferred materialization process, the transaction thread can perform this allocation.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method for implementation by one or more data processors forming part of at least one computing system, the method comprising:
   maintaining an in-memory array in main system memory of the at least one computing system, the in-memory array comprising a column of a database table forming part of an in-memory database system;

writing, to a database object associated with the column, one or more changes to the column resulting from one or more operations executed on the column by a transaction thread comprising a plurality of operations;

marking the database object for materialization in response to completion of all of the plurality of operations of the transaction thread;

allocating, by the transaction thread, one or more pages; and materializing, based on the marking, the column from the in-memory array to the one or more pages stored on a persistent storage, the materializing comprising applying the one or more changes written in the database object, the one or more pages comprising one or more blocks for storing the column, wherein the database object forms part of an object tree corresponding to fragments in a delta store, the object tree including fragment objects in a fragment level, columns in a column level, and dictionaries in a dictionary level;

wherein the persisting is iteratively performed at a fragment level of the in-memory array, at a column level of the in-memory array, and at a dictionary level of the in-memory array;

wherein the materializing comprises persisting one or more metadata values and one or more data values from the in-memory array to the one or more blocks of the one or more pages;

wherein the one or more metadata values comprise one or more of a row count, an encoding type, a bit size, a value count, and a number of blocks;

wherein the one or more data values comprise one or more of a consolidated column data array, a column data value, and a dictionary value array.

2. The method of claim 1, wherein the marking is performed by the transaction thread, and the allocating and the materializing are performed by a materialization thread.

3. The method of claim 2, wherein the materializing consolidates one or more intermediate rollovers resulting from the transaction thread into a single rollover.

4. The method of claim 1, wherein the marking and the allocating are performed by the transaction thread, and the materializing is performed by a materialization thread.

5. The method of claim 1, wherein the materializing is performed in accordance with a predetermined time interval.

6. The method of claim 1, wherein the transaction thread comprises a data manipulation language thread.

7. A computer program product comprising a non-transitory machine readable medium storing instructions that, when executed by at least one programmable processor, cause the at least one programmable processor to perform operations comprising:

maintaining an in-memory array in main system memory of at least one computing system, the in-memory array comprising a column of a database table forming part of an in-memory database system;

writing, to a database object associated with the column, one or more changes to the column resulting from one or more operations executed on the column by a transaction thread comprising a plurality of operations;

marking the database object for materialization in response to completion of all of the plurality of operations of the transaction thread;

allocating, by the transaction thread, one or more pages; and materializing, based on the marking, the column from the in-memory array to the one or more pages stored on a persistent storage, the materializing comprising applying the one or more changes written in the database object, the one or more pages comprising one or more blocks for storing the column, wherein the database object forms part of an object tree corresponding to fragments in a delta store, the object tree including fragment objects in a fragment level, columns in a column level, and dictionaries in a dictionary level;

wherein the persisting is iteratively performed at a fragment level of the in-memory array, at a column level of the in-memory array, and at a dictionary level of the in-memory array;

wherein the materializing comprises persisting one or more metadata values and one or more data values from the in-memory array to the one or more blocks of the one or more pages;

wherein the one or more metadata values comprise one or more of a row count, an encoding type, a bit size, a value count, and a number of blocks;

wherein the one or more data values comprise one or more of a consolidated column data array, a column data value, and a dictionary value array.

8. The computer program product of claim 7, wherein the marking is performed by the transaction thread, and the allocating and the materializing are performed by a materialization thread.

9. The computer program product of claim 8, wherein the materializing consolidates one or more intermediate rollovers resulting from the transaction thread into a single rollover.

10. The computer program product of claim 7, wherein the marking and the allocating are performed by the transaction thread, and the materializing is performed by a materialization thread.

11. The computer program product of claim 7, wherein the materializing is performed in accordance with a predetermined time interval.

12. A system comprising:

computer hardware comprising at least one programmable processor configured to execute instructions causing the at least one programmable processor to perform operations comprising:

maintaining an in-memory array in main system memory of at least one computing system, the in-memory array comprising a column of a database table forming part of an in-memory database system;

writing, to a database object associated with the column, one or more changes to the column resulting from one or more operations executed on the column by a transaction thread comprising a plurality of operations;

marking the database object for materialization in response to completion of all of the plurality of operations of the transaction thread;

allocating, by the transaction thread, one or more pages; and materializing, based on the marking, the column from the in-memory array to the one or more pages stored on a persistent storage, the materializing comprising applying the one or more changes written in the database object, the one or more pages comprising one or more blocks for storing the column, wherein the database object forms part of an object tree corresponding to fragments in a delta store, the object tree including fragment objects in a fragment level, columns in a column level, and dictionaries in a dictionary level;

wherein the persisting is iteratively performed at a fragment level of the in-memory array, at a column level of the in-memory array, and at a dictionary level of the in-memory array;

wherein the materializing comprises persisting one or more metadata values and one or more data values from the in-memory array to the one or more blocks of the one or more pages;

wherein the one or more metadata values comprise one or more of a row count, an encoding type, a bit size, a value count, and a number of blocks;

wherein the one or more data values comprise one or more of a consolidated column data array, a column data value, and a dictionary value array.

\* \* \* \* \*